United States Patent [19]

Raghavan et al.

[11] Patent Number: 5,133,955
[45] Date of Patent: Jul. 28, 1992

[54] LOW TEMPERATURE PREPARATION OF ULTRAFINE OXIDE PARTICLES USING ORGANIZED REACTION MEDIA

[75] Inventors: Srini Raghavan; Subhash H. Risbud; Pradeep P. Phule, all of Tucson, Ariz.

[73] Assignee: Arizona Technology Development Corporation, Tucson, Ariz.

[21] Appl. No.: 288,630

[22] Filed: Dec. 22, 1988

[51] Int. Cl.$^5$ ............................................. C01B 13/14
[52] U.S. Cl. .................................... 423/592; 423/579; 423/594; 502/338
[58] Field of Search ............... 423/592, 604, 605, 606, 423/608, 617, 618, 624, 632, 633635, 641; 502/261

[56] References Cited

U.S. PATENT DOCUMENTS

| | | | |
|---|---|---|---|
| 4,333,846 | 6/1982 | Lee et al. | 423/600 |
| 4,425,261 | 1/1984 | Stenius et al. | 502/339 |
| 4,713,233 | 12/1987 | Marsh et al. | 423/608 |
| 4,714,692 | 12/1987 | Abrevaya et al. | 502/261 |
| 4,714,693 | 12/1987 | Targos | 502/261 |
| 4,758,414 | 7/1988 | Gifford et al. | 423/122 |

*Primary Examiner*—Theodore Morris
*Assistant Examiner*—Edward Squillante
*Attorney, Agent, or Firm*—Harry M. Weiss; Antonio R. Durando

[57] ABSTRACT

The present invention relates to a method for the preparation of ultrafine oxide particles using organized reaction media. Integrated circuit (IC) densities have necessitated the use of ultrahigh purity process fluids in state of the art fabrication facilities. It is the purpose of the present invention to synthesize monodispersed submicron particles of some representative contaminants, such as ultrafine oxide particles, using organized reaction media, and study their characteristics in relation to their removal from process fluids.

6 Claims, 2 Drawing Sheets

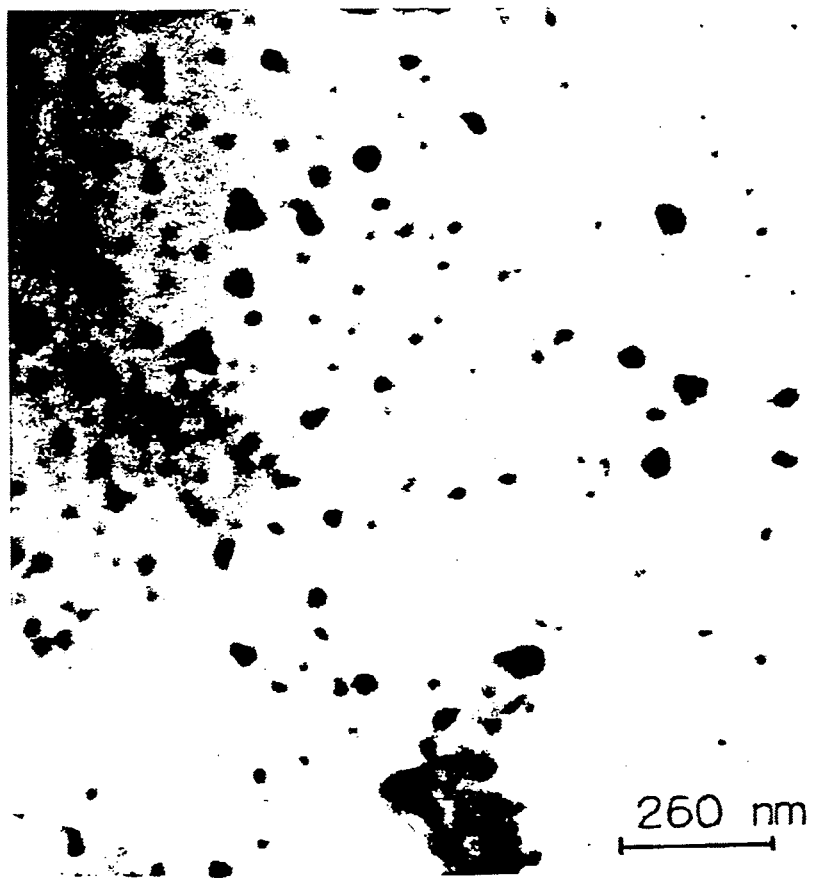

LOW TEMPERATURE PREPARATION OF ULTRAFINE OXIDE PARTICLES USING ORGANIZED REACTION MEDIA

BACKGROUND OF THE INVENTION

Field of the Invention

The present invention relates generally to a method for synthesizing and sequestering ultrafine particles of the type problematic in micro-electronics manufacture. This invention relates more particularly to the preparation and characterization of ultrafine metal oxide particles and potential applications in the field of magnetic electronic and optical materials.

There is a pressing need for the removal of submicron particulate contaminants from process fluids commonly used in semiconductor processing. As circuit geometries have become increasingly small and IC densities higher, these submicron particulates present a major problem in IC fabrication causing a variety of problems such as "bridging" which causes IC malfunction.

SUMMARY OF THE INVENTION

To resolve the difficulties encountered with the submicron particle contamination and to facilitate particulate removal, it is an object of the present invention to provide a new and improved process for the preparation of monodispersed ultrafine oxide particles using organized reaction media which may be commercially used as particle size calibration standards in the microelectronic industry.

It is a further object of the present invention to provide a process for forming reversed micellar structures which act as reaction sites for the formation and sequestration of ultrafine oxide particles.

It is a further object to employ these particles as a representative contaminant and study their characteristics in relation to their removal from process fluids.

The foregoing and other objects, features, and advantages of the invention will be apparent from the following, more particular, description of the compositions and the figures showing structure and particles of the invention.

BRIEF DESCRIPTION OF THE FIGURES

Referring to FIG. 2, there is shown a TEM photomicrograph of microcolloidal oxide particles obtained using reversed micelles according to the present invention.

DETAILED DESCRIPTION OF THE PREFERRED EMBODIMENT

Figure 1:
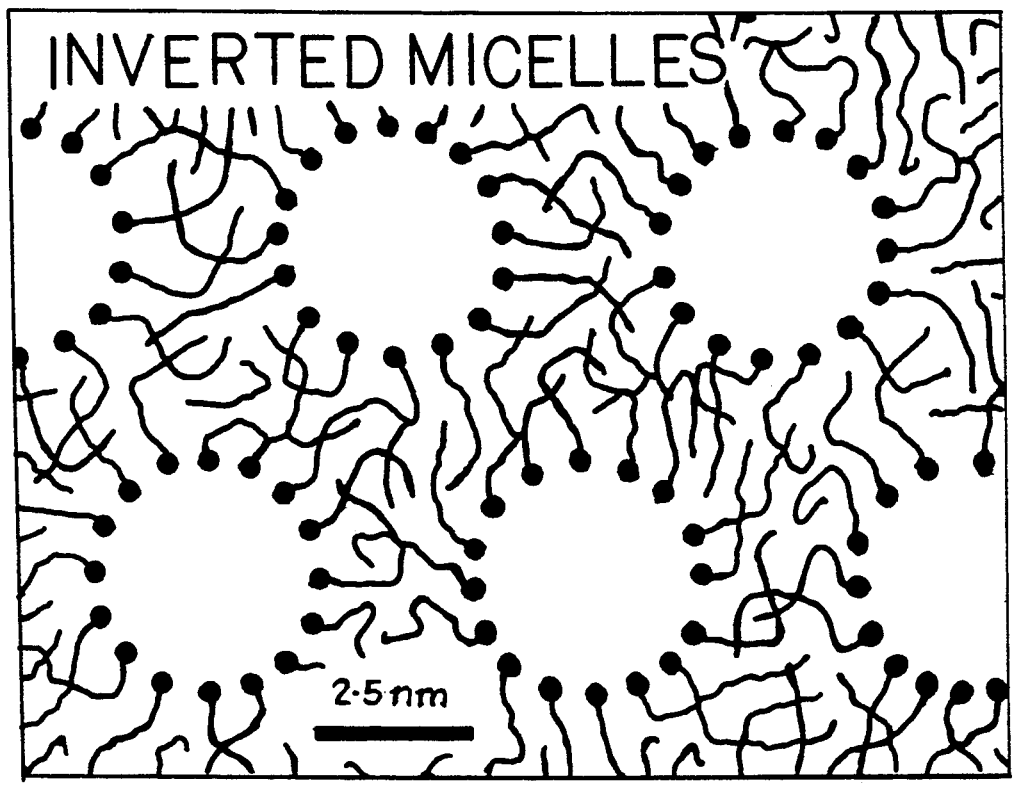
Referring to FIG. 1, there is shown a diagramatic representation of reversed micellar structures.

The instant invention presents a low temperature ($< \approx 70°$ C.) chemical process for the preparation of ultrafine oxide particles. Principally, the method of the present invention contemplates two steps. First, a reversed micellar solution is prepared by mixing an organic phase consisting of an alkyl-substituted halogenated amphipathic surfactant solubilized in an organic alcohol with water. Subsequently the, addition of a metal salt solution completed the formation of the reverse micellar structure. The amphipathic surfactant is selected from the group of amphiphiles having from 10 to 18 carbon atoms, and the alkyl substituent is selected from the group consisting of branched or straight chain groups having from 2–6 carbon atoms, such that the surfactant has the proper hydrophilic-lipophilic balance (HLB) to facilitate formation of the reversed micellar structure. The addition of a water based hydrolyzing agent induces the formation of the ultrafine oxide particles from the metal salt. Critical to the success of the process is the selection, preparation and use of a proper reaction medium such as reversed micelles or a microemulsion. In accordance with the present invention, the micellar structure consists of the following: (1) an alkyl-substituted amphipathic surfactant having the formula:

wherein $R_1$ is a branched or straight chain alkyl substituent having from 10–18 carbon atoms, $R_2$, $R_3$ and $R_4$ are branched or straight chain alkyl substituents having from 2–6 carbon atoms; and X is a halogen; (2) an organic alcohol having the formula:

wherein Y is a branched or straight chair alkyl substituent having from 5–10 carbon atoms; (3) water; and (4) a metal salt.

According to a preferred embodiment of the present invention, reversed micelles in a cetyltrimethylammonium bromide (CTAB)-octanol-aqueous phase system as the reaction medium were used. The aqueous phase consisted of a ferrous and/or ferric chloride solution. Ammonium hydroxide was added (directly or in the solubilized form) to the reversed micelles containing ferrous and/or ferric chloride to form the ultrafine particles of iron (hydrous) oxide. The average particle size and shape was determined using Transmission Electron Microscopy (TEM). Iron (hydrous) oxide as a representative material was prepared in the form of pseudo-spherical particles having average diameter of 40 nm.

EXAMPLE

1. Preparation of the reversed micellar solutions

The reversed micellar solutions containing CTAB, n-octanol and an aqueous phase containing the reactants were prepared as follows: 10.0 g CTAB was weighed into a clean glass beaker and 50.0 ml. of n-octanol was added to it. Gentle stirring resulted in formation of a milky solution. To prepare the in reversed micelles in which, for example, ferric chloride is solubilized, the following steps were taken. To the milky solution (containing the CTAB and octanol) 3.6 ml. of a 1.4M ferric chloride solution (pH $\approx 2.0$) was added in a dropwise manner, with continued stirring; 5.4 ml. of distilled and deionized water was then added to obtain the reversed micellar solution of the desired composition. The formation of the reversed micelles was evident from the transformation of the original milky solution into a clear transparent and seemingly homogeneous solution. Similar steps were then followed to prepare the reversed micellar solutions in which ferrous chloride and ammonia solutions were solubilized. The exact compositions of the reversed micellar solutions are presented in Table I.

TABLE I

Composition of micellar solutions used for the synthesis of microcolloidal iron oxide particles

| Solubilized Reactant | REACTANT ml. | WATER ml. | OCTANOL ml. | CTAB g |
|---|---|---|---|---|
| 1.4M Ferric Chloride | 3.6 | 5.4 | 50.0 | 10.0 |
| 1.4M Ferrous Chloride | 2.0 | 1.0 | 50.0 | 10.0 |
| 15.0M Ammonia Solution | 4.0 | 2.0 | 50.0 | 10.0 |

It is pertinent to point out that by this procedure the reactants are solubilized into the dispersed microspheres (size $\approx 3$ nm) of the aqueous phase. These microspheres provide the miniature reactors for the reactions leading to the preparation of microcolloidal particles. Proper selection, characterization and careful preparation of these reversed micellar solutions are the key factors for the successful formation of uniform and monodisperse microcolloidal particles.

2. Preparation of microcolloidal particles of iron oxide from the reversed micellar solutions To obtain the microcolloidal particles, 38.0 ml. and 6.3 ml. of the reversed micellar solutions of ferrous and ferric chloride, respectively, prepared according to the steps previously described, were mixed into a glass beaker. The mixture was then gently stirred for approximately 10 minutes. Dropwise additions of 30.0 ml. of the reversed micellar solution containing 15M ammonia were made. This resulted in the formation of a green dye of microcolloidal iron oxide particles. The particles were in the form of a very stable dispersion and did not settle for many hours. The stability of the suspension of the particles may be attributed to the microcolloidal size of the particles and the possible adsorption of the surfactant molecules onto the surface of the particles.

The process relies on the compartmentalization of one or more reaction species into the dispersed phase of the organized reaction medium. Depending on the chemistry and the relative amount of reactants, the dispersed phase may consist of oil, water, or water core of reversed micelles in which at least some of the reaction species are solubilized. Thus, the dispersed phase provides a large number of microreactors in which the reactions responsible for the formation of ultrafine particles can occur.

The iron oxide particles may be removed from the microemulsion by any of a number of well-known methods.

While the invention has been particularly shown and described with reference to a certain preparation of oxide particles thereof, it will be understood by those skilled in the art that the foregoing and other changes in composition and details may be made therein without departing from the spirit and scope of the invention.

We claim:

1. A process for preparing monodispersed metal oxide particles of a desired composition to be used as a particle size calibration standard in the microelectronic industry, comprising the steps of:
   (a) preparing an organic phase comprising
     (1) an alkyl-substituted amphipathic surfactant having the formula:

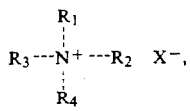

wherein $R_1$ is a branched or straight chain alkyl substituent having from 10 to 18 carbon atoms; $R_2$, $R_3$ and $R_4$ are branched or straight chain alkyl substituents having from 2 to 6 carbon atoms; and X is a halogen; and
     (2) an organic alcohol having the formula:

Y—OH wherein Y is a branched or straight chain alkyl substituent having from 5 to the 10 carbon atoms;
   (b) adding a metal salt water solution containing one of the metal ions constituent of said desired composition to form a reverse miscellar solution;
   (c) repeating steps (a) and (b) to form separate reverse miscellar solutions for each other metal ions constituent of said desired composition;
   (d) repeat step (a) form a reverse miscellar solution of a hydrolyzing agent by adding a water solution of said hydrolyzing agent to the admixture produced by repeating step (a);
   (e) combining all metal-ion reverse miscellar solutions prepared according to steps (a) through (c) to form a single reverse micellar solution containing all metal ions constituent of said desired composition; and
   (f) hydrolyzing said metal ions by mixing said reverse micellar solution of a hydrolyzing agent produced according to step (d) to the solution produced by step (e) to form monodispersed hydrous metal oxide particles of said desired composition.

2. The process according to claim 1, wherein said alkyl substituted amphipathic surfactant is cetyltrimethylammonium bromide.

3. The process according to claim 2, wherein said organic alcohol is n-octanol.

4. The process according to claim 3, wherein all metal ions constituent of said desired composition consist of ferrous and ferric ions, and wherein said metal salts used to form reverse miscellar solutions according to steps (a) through (c) consist of ferrous and ferric chlorides.

5. The process according to claim 4, wherein said hydrolyzing agent consists of ammonia.

6. The process according to claim 5, wherein the composition of said reverse miscellar solutions produced by steps (a) through (d) is approximately as follows:

| Solubilized Reactant | Reactant ml. | Water ml. | n-Octanol ml. | CTAB g |
|---|---|---|---|---|
| 1.4M Ferric Chloride | 3.6 | 5.4 | 50.0 | 10.0 |
| 1.4M Ferrous Chloride | 2.0 | 1.0 | 50.0 | 10.0 |
| 15.0M Ammonia Solution | 4.0 | 2.0 | 50.0 | 10.0 |

* * * * *